(12) United States Patent
Sakanashi

(10) Patent No.: US 9,269,039 B2
(45) Date of Patent: Feb. 23, 2016

(54) RFID TAG

(75) Inventor: Koichi Sakanashi, Chiba (JP)

(73) Assignee: Provident Corporation, Chiba (JP)

( * ) Notice: Subject to any disclaimer, the term of this patent is extended or adjusted under 35 U.S.C. 154(b) by 0 days.

(21) Appl. No.: 13/697,037

(22) PCT Filed: Aug. 16, 2012

(86) PCT No.: PCT/JP2012/070849
§ 371 (c)(1),
(2), (4) Date: Nov. 9, 2012

(87) PCT Pub. No.: WO2013/114655
PCT Pub. Date: Aug. 8, 2013

(65) Prior Publication Data
US 2014/0332596 A1    Nov. 13, 2014

(30) Foreign Application Priority Data
Jan. 31, 2012  (JP) ................. 2012-017455

(51) Int. Cl.
*G08B 13/24*  (2006.01)
*G06K 19/07*  (2006.01)
(Continued)

(52) U.S. Cl.
CPC .......... *G06K 19/0776* (2013.01); *G06K 19/077* (2013.01); *G06K 19/0772* (2013.01); *G06K 19/07758* (2013.01); *G08B 13/2434* (2013.01); *G09F 3/10* (2013.01)

(58) Field of Classification Search
CPC ............ B65D 2211/00; E05B 73/0017; G08B 13/2434; G08B 13/2437; G08B 13/2442; G08B 13/2445; G08B 13/2448; G09F 3/0335; G09F 3/10; G06K 19/077; G06K 19/0772; G06K 19/07758; G06K 19/0776

USPC ................. 235/492; 340/572.1, 572.8, 572.9, 340/568.1, 568.2
See application file for complete search history.

(56) References Cited

U.S. PATENT DOCUMENTS 5,949,336 A * 9/1999 Deschenes et al. ......... 340/572.8
5,969,613 A * 10/1999 Yeager et al. .............. 340/572.9
(Continued)

FOREIGN PATENT DOCUMENTS

JP    2007-172369    7/2007
JP    2007-172527    7/2007
(Continued)

OTHER PUBLICATIONS

International Search Report for PCT/JP2012/070849 dated Oct. 16, 2012.
(Continued)

*Primary Examiner* — Michael G Lee
*Assistant Examiner* — Suezu Ellis
(74) *Attorney, Agent, or Firm* — Venable LLP; Jeffri A. Kaminski; Trent B. Ostler

(57) ABSTRACT

The present invention provides an RFID tag that can be stably attached to objects of various shapes and sizes including, for example, narrow side surfaces of plate-like objects. An RFID tag 100 has a container 10, RFID inlet 30, spacer 50, and protruding part 70. The container has at least one rectangular flat surface 11. The RFID inlet is stored in the container. The spacer is embedded in the container. The protruding part is provided so as to protrude outwardly from the flat surface over the length of one of long sides of the flat surface. The protruding part is also provided so as to be foldable along the long side.

9 Claims, 8 Drawing Sheets

(51) Int. Cl.
*G09F 3/10* (2006.01)
*G06K 19/077* (2006.01)

(56) References Cited

U.S. PATENT DOCUMENTS

| 7,005,989 B2 * | 2/2006 | Benoit et al. ............... 340/572.5 |
| 2004/0066296 A1 * | 4/2004 | Atherton ................... 340/572.1 |
| 2004/0074974 A1 * | 4/2004 | Senba et al. ................. 235/492 |

FOREIGN PATENT DOCUMENTS

| JP | 2007-310488 | 11/2007 |
| JP | 2008-272940 | 11/2008 |
| JP | 2010-026679 | 2/2010 |

OTHER PUBLICATIONS

Translation of Japanese Office Action of Feb. 28, 2012.

* cited by examiner

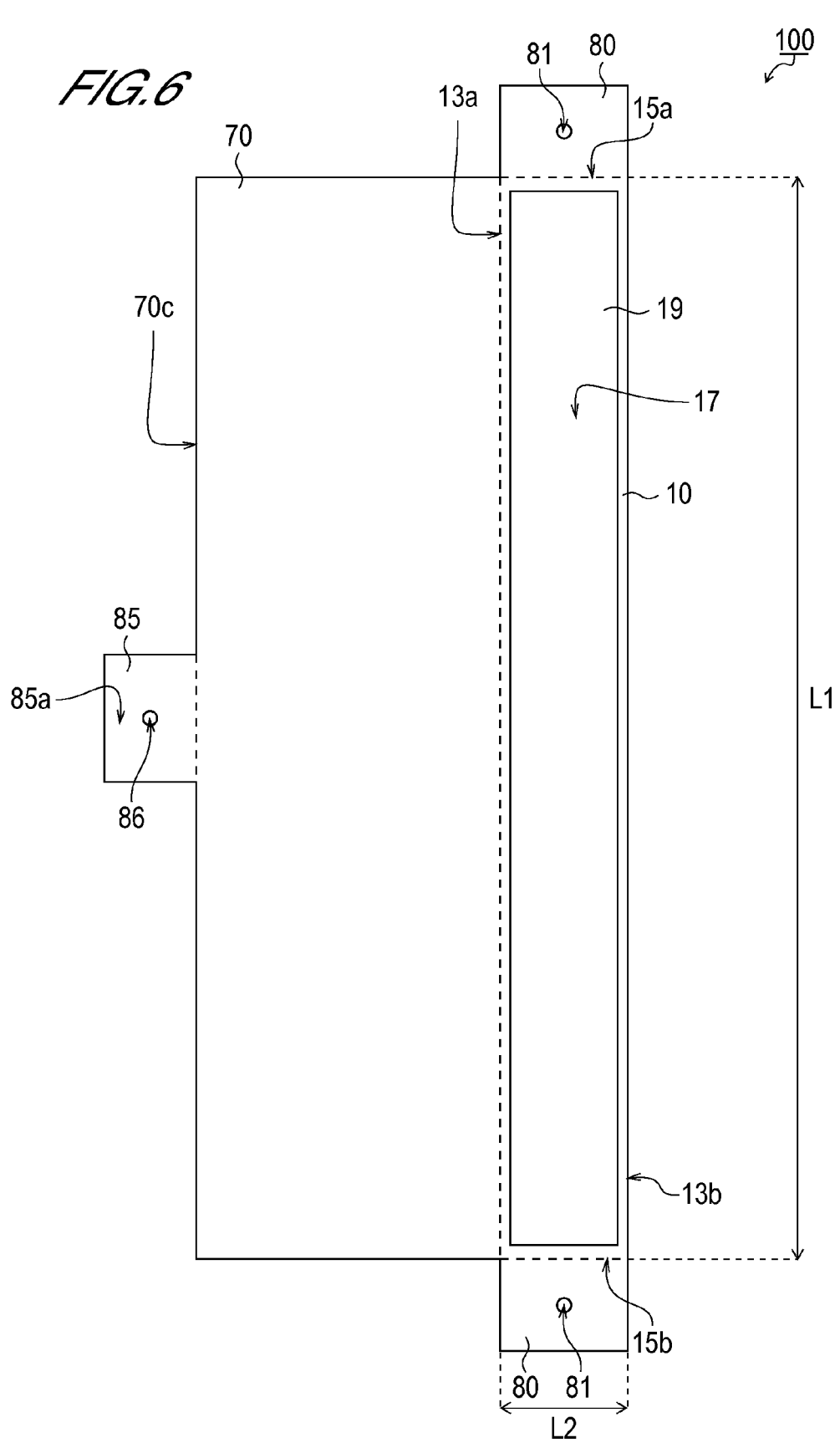

RFID TAG

TECHNICAL FIELD

The present invention relates to a radio frequency identification (RFID) tag that is attached to an object to transmit/receive information by using radio waves as an information transmission/reception medium.

BACKGROUND ART

An RFID tag having an IC chip for storing information and an antenna used for transmitting/receiving the information is known as a tag for RFID. The IC chip of the RFID tag is activated in response to a radio wave received from a reader/writer for reading/writing the information, to transmit the information stored in the IC chip in the form of a radio wave. This RFID tag is attached to, for example, an object, for the purpose of managing the object.

When the RFID tag is attached to a surface of a metallic object, electromotive force that is induced in the antenna is lowered by the radio wave transmitted from the reader/writer. As a result, the IC chip cannot be activated.

As such an RFID tag that can be attached to a surface of a metallic object, there is an RFID tag having an IC chip and antenna stored in a container (e.g., TFU-TM28×B, a tag for a small metal, manufactured by Fujitsu Frontech Limited).

There is also an RFID label that has a tubular RFID holder with a rectangular cross section, which holds an IC chip and antenna, and an attached part bonded to an object (see Patent Document 1, for example). The RFID holder of the RFID label according to Patent Document 1 can protrude in a direction away from the object. Therefore, the IC chip and the antenna can have a sufficient distance with the metallic object. The RFID label according to Patent Document 1, therefore, can be attached to a surface of the metallic object.

Patent Document 1: Japanese Patent Application Publication No. 2007-172369

For example, steel mills and other factories often use RFID tags, for the purpose of managing plate-like objects such as metal plates. Normally, the plate-like objects are disposed by stacking a plurality of flat plate surfaces thereof one on top of the other. In order to manage the plurality of the stacked plate-like objects, the RFID tags are preferably attached to side surface of the objects perpendicular to the flat plate surfaces instead of being attached to the flat plate surfaces.

Therefore, when the areas or widths of the surfaces of the objects to which the tags are attached (referred to as "attached surfaces of the objects," hereinafter) are too small, the areas or widths of attached surfaces of the RFID tags need to be reduced in accordance with the areas or widths of the attachment surfaces of the objects to which the tags are attached. This might make the RFID tags fall off the objects easily.

However, in the abovementioned RFID tag using a container, one flat surface of the container is configured as an attachment surface by being applied with, for example, an adhesive.

Furthermore, the RFID holder of the RFID label according to Patent Document 1 is in a cylindrical shape. For this reason, the bottom of the RFID holder cannot be configured as an attachment surface. This RFID label therefore provides poor attachment stability.

It is, therefore, difficult to stably attach the conventional RFID tags to the side surfaces of plate-like objects.

DISCLOSURE OF THE INVENTION

The present invention was contrived in view of the problems described above, and an object thereof is to provide an RFID tag that can be stably attached to objects of various shapes and sizes including, for example, narrow side surfaces of plate-like objects and places with small areas to be attached with the RFID tag.

In order to achieve the object described above, an RFID tag of the present invention has a container, an RFID inlet, a spacer, a protruding part, and an attaching member. The container has at least one rectangular flat surface. The RFID inlet is stored in the container. The spacer is embedded in the container. The protruding part is provided so as to protrude outwardly from the flat surface over the length of one of long sides of the flat surface. The protruding part is also provided so as to be foldable along the long side. The attaching member is in the form of a sheet. The attaching member has at least one of a pair of main surfaces facing each other as an adhesive surface. The protruding part has a protruding-part attached surface. The protruding-part attached surface configures an attachment surface along with the flat surface. The attaching member has one of the main surfaces attached over the flat surface and the protruding-part attached surface.

According to the RFID tag of the present invention, the flat surface of the container and the protruding part that protrudes so as to be foldable from the flat surface can be configured as an attachment surface that is attached to an object. Therefore, the RFID tag can be attached to an area wider than one of the surfaces of the container storing the RFID inlet therein, improving the adhesiveness. The flat surface of the container can be attached to, for example, a side surface of a plate-like object. The protruding part can be attached to a flat plate surface of the object. As a result, the RFID tag can be attached over the two surfaces, i.e., the side surface and the flat plate surface of the plate-like object. The RFID tag of the present invention, therefore, can be attached stably to a side surface of a plate-like object even when the width of the side surface of the object is narrow.

BRIEF DESCRIPTION OF THE DRAWINGS

FIG. 6 is a plan view of the RFID tag of the present invention;

BEST MODE FOR CARRYING OUT THE INVENTION

Embodiments of the present invention are described hereinafter with reference to the drawings. The shapes and sizes of the components as well as the positional relationship thereof that are described hereinafter are merely exemplary representations provided to make the present invention understood properly. In addition, favorable configuration examples of the present invention are described hereinafter, but the materials, numerical conditions and the like of the components are merely favorable examples. Therefore, the present invention is not limited to the following embodiments, and various changes or modifications that can accomplish the effects of the present invention can be made without departing from the scope of the configurations of the present invention.

Figure 1:
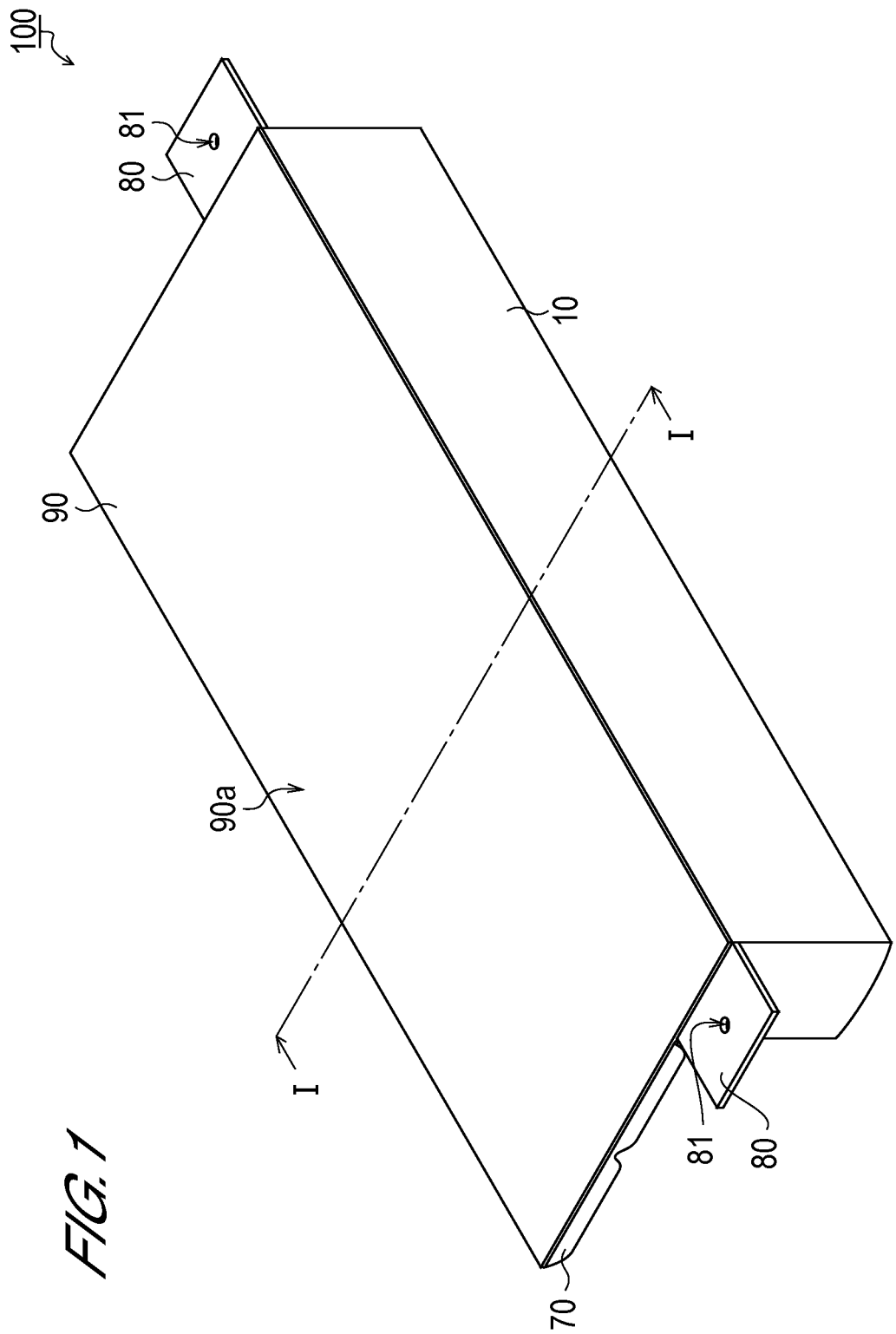
FIG. 1 is a perspective view of an RFID tag of the present invention.
Figure 2:
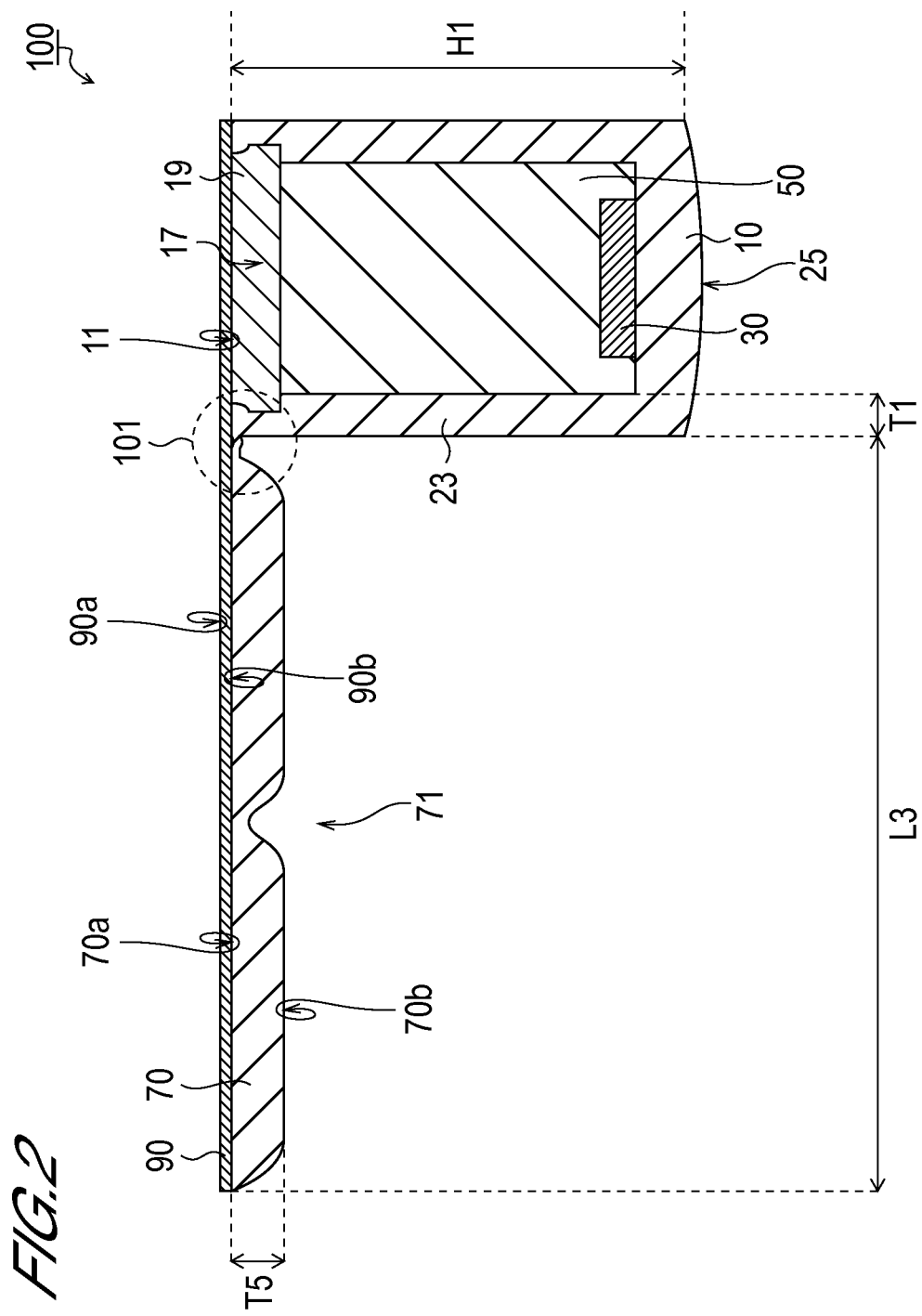
FIG. 2 is an end view of the RFID tag of the present invention.
Figure 3:
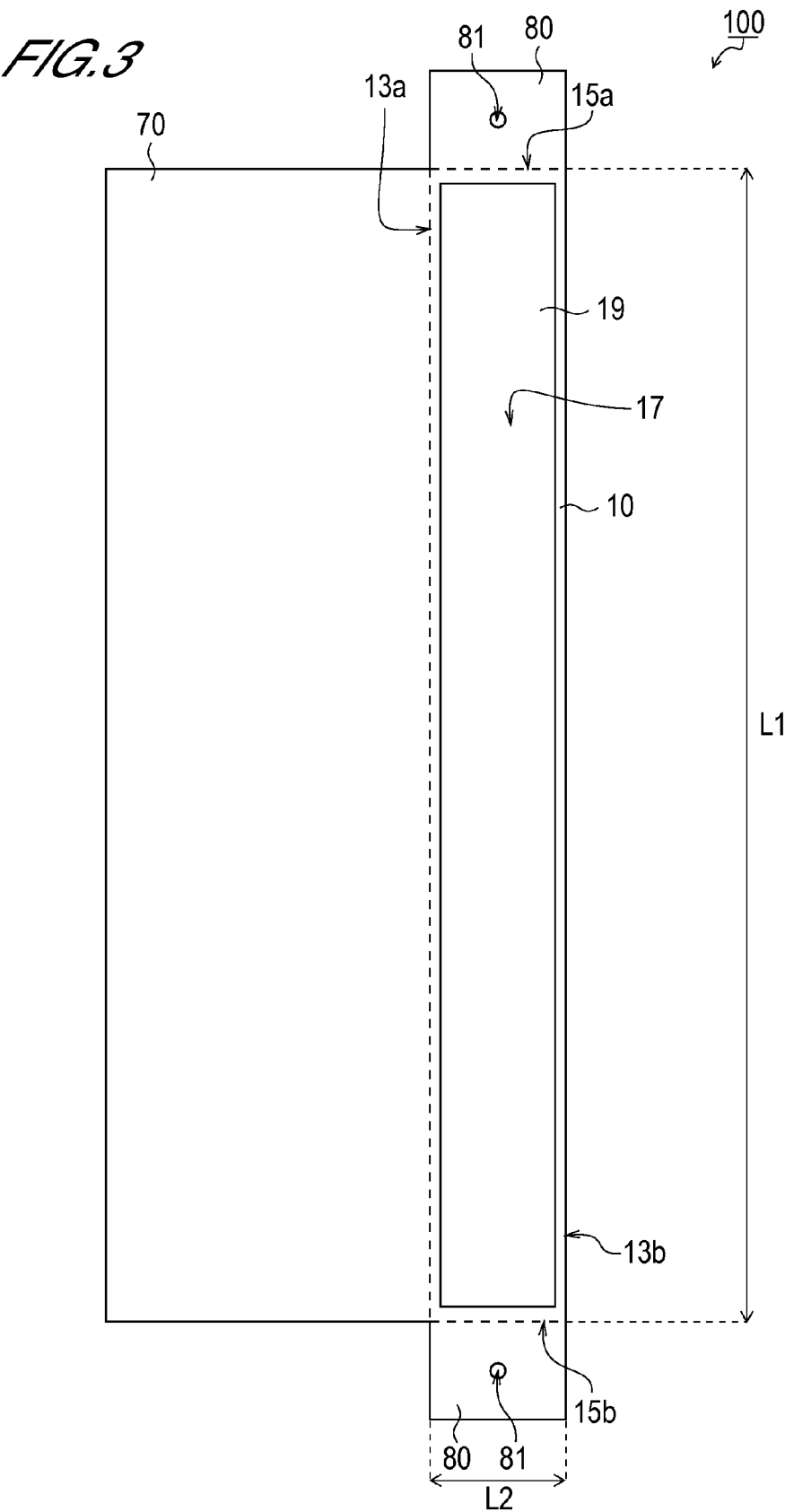
FIG. 3 is a plan view of the RFID tag of the present invention.

An embodiment of an RFID tag according to the present invention is now described with reference to FIGS. 1 to 3. FIGS. 1 to 3 are schematic diagrams each showing an RFID tag according to the present embodiment. FIG. 1 is a perspective view of the RFID tag. FIG. 2 is an end view showing a section obtained by cutting the RFID tag along a line I-I shown in FIG. 1. FIG. 3 is a plan view in which the RFID tag is viewed from a flat surface of a container. Note that FIG. 3 does not show an attaching member.

An RFID tag 100 has a container 10, RFID inlet 30, spacer 50, protruding part 70, and attaching member 90.

The container 10 is a three-dimensional hollow container. The container 10 has at least one flat surface 11. FIGS. 1 and 2 show configuration examples of the container 10 that is in the shape of a box with three pairs of surfaces facing each other. It is preferred that the material of the container 10 be a heat resistant and water resistant resin with high flexibility. The container 10 is preferably made of, for example, polycarbonate.

A surface 25 that faces the flat surface 11 of the container 10 (simply referred to as "opposing surface 25," hereinafter) preferably is a curved surface that is convexed away from the flat surface 11. For example, external force that is applied to the vicinity of the opposing surface 25 of the RFID tag 100 can be diverted by forming the opposing surface 25 into a curved surface. This prevents the RFID tag 100 from falling off an object to which the RFID tag 100 is attached.

The flat surface 11 has a rectangular planar shape. The flat surface 11 is configured by two pairs of sides facing each other. One of the pairs consists of long sides 13a and 13b. The other pair consists of short sides 15a and 15b shorter than the long sides 13a and 13b.

Furthermore, an opening 17 penetrating from the flat surface 11 through the container 10 is formed in the container 10. The container 10 is also provided with a lid 19 for closing the opening 17. It is preferred that the material of the lid 19 be a heat resistant and water resistant resin with high flexibility. As with the container 10, the lid 19 is preferably made of, for example, polycarbonate.

Figure 4:
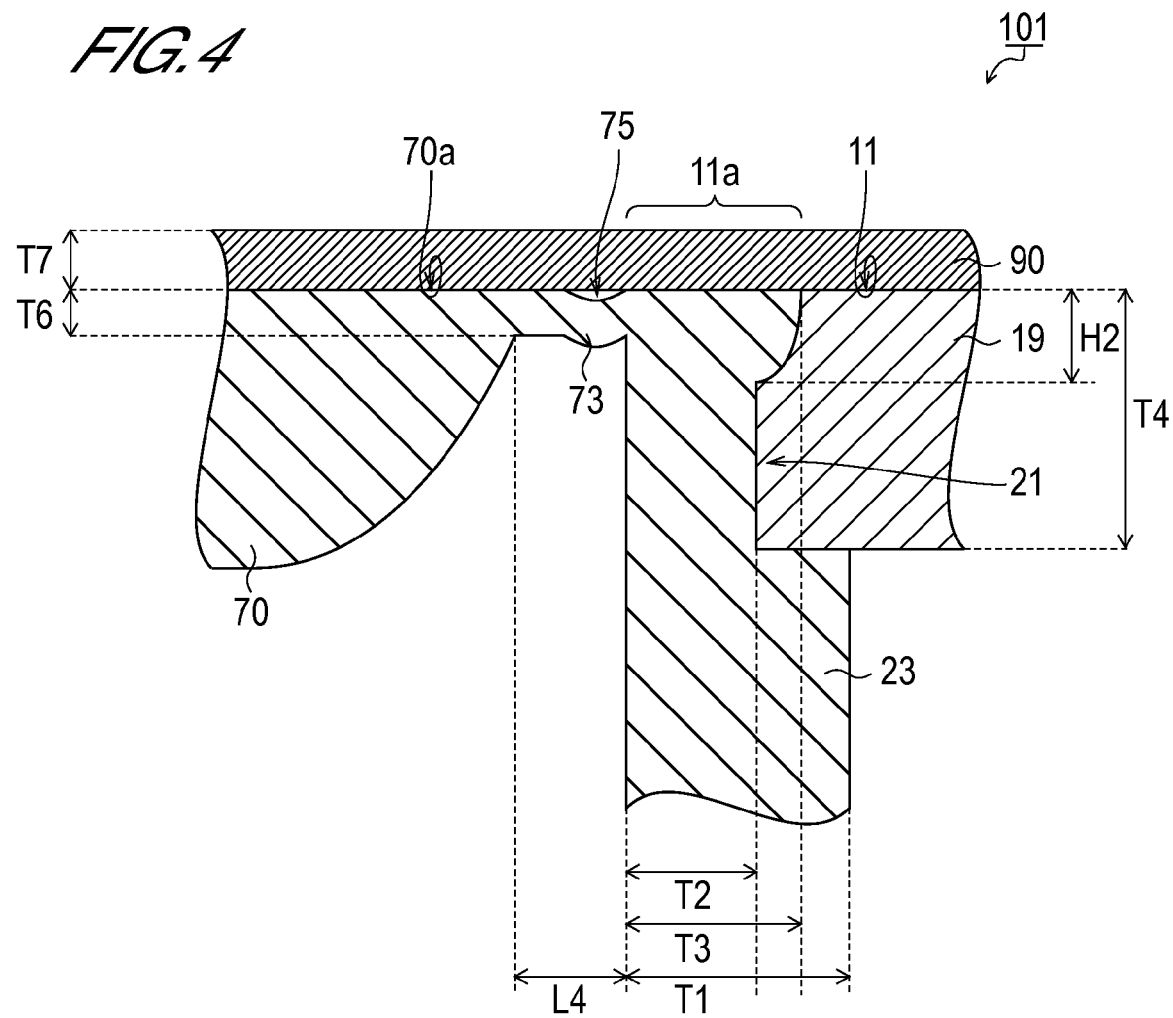
FIG. 4 is a partial enlarged view of the RFID tag of the present invention.

FIG. 4 is a diagram showing an enlargement of a part surrounded by a dashed line 101 shown in FIG. 2. As shown in FIG. 4, the lid 19 is fixed by being fitted into a concave part 21 formed in a periphery part 11a defining the opening 17. FIG. 4 shows a configuration example in which the concave part 21 is formed in a side wall 23 of the periphery part 11a in the container. The side wall 23 has different thickness as a result of having the concave part 21 therein. In other words, the thickness of the side wall 23 on the flat surface 11 side, with the concave part 21 therein, is smaller than the thickness of the side wall 23 on the opposite side of the flat surface 11.

The RFID inlet 30 is stored in the container 10. The RFID inlet 30 has an IC chip and an antenna (not shown). The IC chip is apart for electrically storing information. The antenna is a part for transmitting/receiving information. A commercially available inlet can be used as the RFID inlet 30.

The spacer 50 is embedded in the container 10. The spacer 50 separates the RFID inlet 30 from the flat surface 11 on a side of the lid 19 of in the container 10. Styrene foam, for example, can be used as the material of the spacer 50. The spacer 50 may be made of, for example, an insulating material in order to improve the thermal insulation of the RFID inlet 30.

Figure 5:
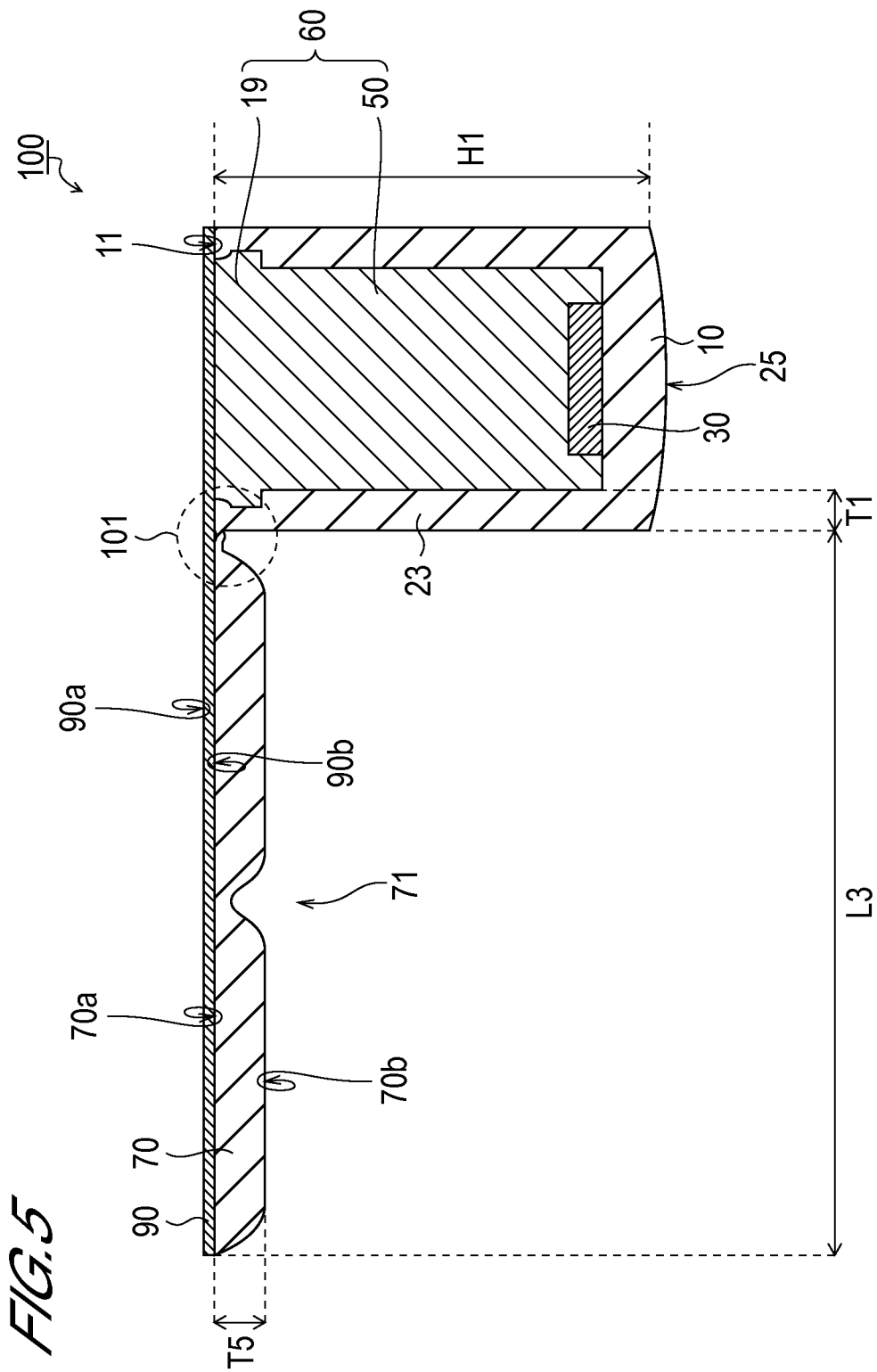
FIG. 5 is an end view of the RFID tag of the present invention.

The spacer 50 may be integrated with the lid 19. FIG. 5 shows a configuration example in which the spacer 50 and the lid 19 are integrally configured. As with FIG. 2, FIG. 5 is a diagram showing an end view of a section obtained by cutting the RFID tag 100 along a line I-I shown in FIG. 1. A structure 60, obtained by integrating the spacer 50 and the lid 19, is preferably configured by forming the spacer 50 as apart of the lid 19. Thus, as with the lid 19, the structure 60 is preferably made of, for example, polycarbonate.

The protruding part 70 is provided in a manner as to protrude from the flat surface 11 to the outside over the length of the one long side 13a of the flat surface 11. It is preferred that the pair of long sides 13a and 13b be the longest sides out of the sides configuring the container 10. It is preferred that the protruding part 70 be integrated with the container 10 using the same material as that of the container 10.

The protruding part 70 is preferably a plate-like body that has two main surfaces 70a and 70b facing each other. The main surface 70a of the protruding part 70 is used as a part of an attachment surface of the RFID tag 100 when attaching the RFID tag 100 to the object. The main surface 70a of the protruding part 70 is also referred to as "protruding-part attached surface 70a," hereinafter. The protruding-part attached surface 70a is preferably made flush with the flat surface 11 of the container 10. It is preferred that the length of the protruding part 70 along the short sides 15a and 15b be adjusted according to the size or shape of an attachment surface of the object to which the RFID tag 100 is attached.

It is also preferred that the area of the protruding-part attached surface 70a be the same as or larger than that of the flat surface 11. In this case, the area of the attachment surface is more than twice the area of the flat surface 11. For this reason, stability of attaching the RFID tag 100 to the object can be improved. The area of the protruding-part attached surface 70a may be set to be smaller than that of the flat surface 11 in accordance with the shape or size of the object, as long as the RFID tag 100 can stably be attached to the object.

Moreover, in the protruding part 70, preferably a groove-like depression 71 is formed along the long side 13a and on the main surface 70b side on the side opposite to the protruding-part attached surface 70a. It is preferred that this depression 71 be formed in, for example, an intermediate position of the protruding part 70 in a lengthwise direction along the short sides 15a and 15b. Due to the depression 71 formed in the protruding part 70, the protruding part 70 can be curved easily. Therefore, even when a surface of the object to which the protruding part 70 is attached is curved, the protruding part 70 can fit the curve of the surface.

Also, as shown in FIG. 4, in the vicinity of the boundary with the container 10 the protruding part 70 includes a thin plate part 73 formed in a small thickness from a side of the main surface 70b. Thus, the protruding part 70 can be folded easily toward the flat surface 11 with respect to the long side 13a.

In the thin plate part 73, a groove-like depression 75 also is preferably formed on the protruding-part attached surface 70a along the long side 13a. Due to the depression 75 formed in the thin plate part 73 of the protruding part 70, deflection of the attaching member 90, which results from folding the protruding part 70 toward the flat surface 11, fits inside the depression 75. For this reason, the protruding part 70 can be folded without generating deflection in the attaching member 90.

The attaching member 90 is in the form of a sheet and has a pair of main surfaces 90a and 90b being opposite each other. At least the main surface 90b out of the main surfaces 90a and 90b of the attaching member 90 is an adhesive surface. The main surface 90b of the attaching member is also referred to as "adhesive surface 90b." The adhesive surface 90b of the attaching member 90 is attached to the flat surface 11 and the protruding-part attached surface 70a of the protruding part 70. The attaching member 90 may be integrally configured so as to be laid across the flat surface 11 and the protruding-part attached surface 70a. Also, the attaching part 90 may be provided on the flat surface 11 and the protruding-part attached surface 70a individually. FIGS. 1 and 2 show configuration examples in which the attaching member 90 is provided integrally so as to be laid across the flat surface 11 and the protruding-part attached surface 70a.

The other main surface 90a can also be configured as, for example, an adhesive surface, as with the main surface 90b. In this case, the main surface 90a is preferably coated with, for example, a cover (not shown). The cover is peeled off from the main surface 90a when the RFID tag 100 is attached to the object. The RFID tag 100 can be attached to the object by using the main surface 90a which is an adhesive surface exposed as a result of peeling off the cover. In a case where the main surfaces 90a and 90b are configured as adhesive surfaces, a double-sided adhesive tape (e.g., a peelable both-sided adhesive table T3830, manufactured by NITOMS Inc.) can be used as the attaching member 90. When using the peelable both-sided adhesive table T3830, the RFID tag 100 attached to the object can be peeled off from the object and then attached to the object a number of times. Therefore, the RFID tag 100 can be used repeatedly. When not using the RFID tag 100 repeatedly, other type of both-sided adhesive tape with stronger adherence can be used.

In another configuration example, the other main surface 90a can be configured as a magnet surface. The magnet surface is configured by providing a magnet on the entire surface of the other main surface 90a, a surface of a partial region of the main surface 90a, or inside the attaching member 90. In this case, the RFID tag 100 can be attached to a surface of an object by means of the magnet provided in the main surface 90a, the surface of the object being made of metal such as iron. In a case where the main surface 90a is configured as a magnet surface and the main surface 90b as an adhesive surface, a magnet tape (Maku-370, manufactured by Kokuyo S&T Co., Ltd.) can be used as the attaching member 90. When using the Maku-370, the RFID tag 100 can be repeatedly attached to the object or peeled off from the object. Thus, the RFID tag 100 can be used repeatedly.

It is preferred that the attaching member 90 be attached and laid across the lid 19 and the periphery part 11a of the opening 17 of the flat surface 11. By coating the boundary between the lid 19 and the periphery part 11a with the attaching member 90 as described above, the waterproof property of the inside of the container 10 can be improved.

In addition, the RFID tag 100 can be provided with a pair of sub protruding parts 80 in addition to the components described above.

The pair of sub protruding parts 80 is provided in a manner as to protrude from the flat surface 11 to the outside at the pair of short sides 15a and 15b of the flat surface 11, the short sides 15a and 15b facing each other. The sub protruding parts 80 are preferably integrated with the container 10 using the same material as that of the container 10.

It is preferred that each of the sub protruding parts 80 be a plate-like body that has two main surfaces 80a and 80b facing each other. Each of the protruding parts 80 has a screw hole 81 penetrating through the corresponding main surface 80a or 80b. When attaching the RFID tag 100 to an object, the RFID tag 100 can be screwed to the object through the screw holes 81. Therefore, the RFID tag 100 can be attached to the object tightly.

Aside from the pair of sub protruding parts 80 described above, a sub protruding part 85 may be provided so as to protrude from the long side 13b of the flat surface 11 on the side opposite to the side where the protruding part 70 is provided, and/or from an end 70c of the protruding part 70 on the side opposite to the container 10. FIG. 6 shows a configuration example of the tag provided with the sub protruding part 85. As with FIG. 3, FIG. 6 is a plan view in which the RFID tag 100 is viewed from the flat surface 11 of the container 10, but does not show the attaching member 90. FIG. 6 shows a configuration example in which the end 70c of the protruding part 70 is provided with the sub protruding part 85.

The sub protruding part 85 according to this configuration example is preferably integrated with the protruding part 70 by using, for example, the same material as those of the container 10 and the protruding part 70.

It is preferred that the sub protruding part 85 be a plate-like body having a main surface 85a and an opposing surface facing the main surface 85a. The sub protruding part 85 has a hole 86 penetrating through the main surface 85a and the opposing surface facing the main surface 85a. When attaching the RFID tag 100 to the object, a string or wire can be passed through the hole 86 to wrap the object with the string or wire. Therefore, the RFID tag 100 can be attached to the object tightly.

In the RFID tag 100 described above, the flat surface 11 of the container 10 and the protruding-part attached surface 70a that are coated with the attaching member 90 can be configured into an attachment surface attached to an object. Therefore, the flat surface 11 of the container 10 can be attached to a side surface of, for example, a plate-like object. Also, the protruding part 70 can be attached to a flat plate surface of the object. As a result, the RFID tag 100 can be attached over the two surfaces, i.e., the side surface and the flat plate surface of the object. Therefore, even when the width of the side surface of the object is narrow, the RFID tag 100 can be attached stably to this side surface.

The RFID tag 100 can be produced by, for example, the following method. In other words, first, the container 10 and the lid 19 that are integrated with the protruding part 70 are formed using, for example, a metal mold. Thereafter, the RFID inlet 30 and the spacer 50 are stored, sequentially in this order, in the container 10. Next, the lid 19 is placed to close the opening 17 of the container 10. The lid 19 can be fitted into the concave part 21 by, for example, being manually pushed into the opening 17 in a direction perpendicular to the flat surface 11. Then, the attaching member 90 is attached thereto. In this manner, the RFID tag 100 can be produced easily with a small number of steps.

When integrally configuring the spacer 50 and the lid 19 (see FIG. 5), a metal mold or the like is used to integrate the lid 19 and the spacer 50 to form the structure 60 instead of the lid 19. In this case, the step of storing the spacer 50 in the container 10 can be omitted because the spacer 50 does not need to be prepared separately. Therefore, the RFID tag 100 can be produced more easily.

Examples of favorable measurements of the RFID tag 100 are as follows. In other words, it is preferred that a length L1 of the container 10 in the direction of the long sides 13a and 13b be 100 mm, a length L2 of the container 10 in the direction of the short sides 15a and 15b be 4.5 mm, a height H1 be 6.4 mm, a thickness T1 of the side wall 23 be 0.6 mm, a thickness T2 of a section in the side wall 23 where the concave part 21 is formed be 0.35 mm, a thickness T3 of the side wall 23 near the flat surface 11 with the concave part 21 be 0.45 mm, a height H2 of the section having this thickness T3 be 0.15 mm, a thickness T4 of the lid 19 be 0.7 mm, a thickness T5 of the protruding part 70 be 0.7 mm, a thickness T6 of the thin plate part 73 of the protruding part 70 be 0.2 to 0.35 mm, a length L3 of the protruding part 70 in the direction of the short sides 15a and 15b be 10.5 mm, a length L4 of the thin plate part 73 of the protruding part 70 in the direction of the short sides 15a and 15b be 3.5 mm, and a thickness T7 of the attaching member 90 be 0.16 mm. Note that these dimensions may be set appropriately in accordance with the shape and size of the attachment surface of an object and the size of the RFID inlet 30 to be stored in the container 10.

Figure 7A:
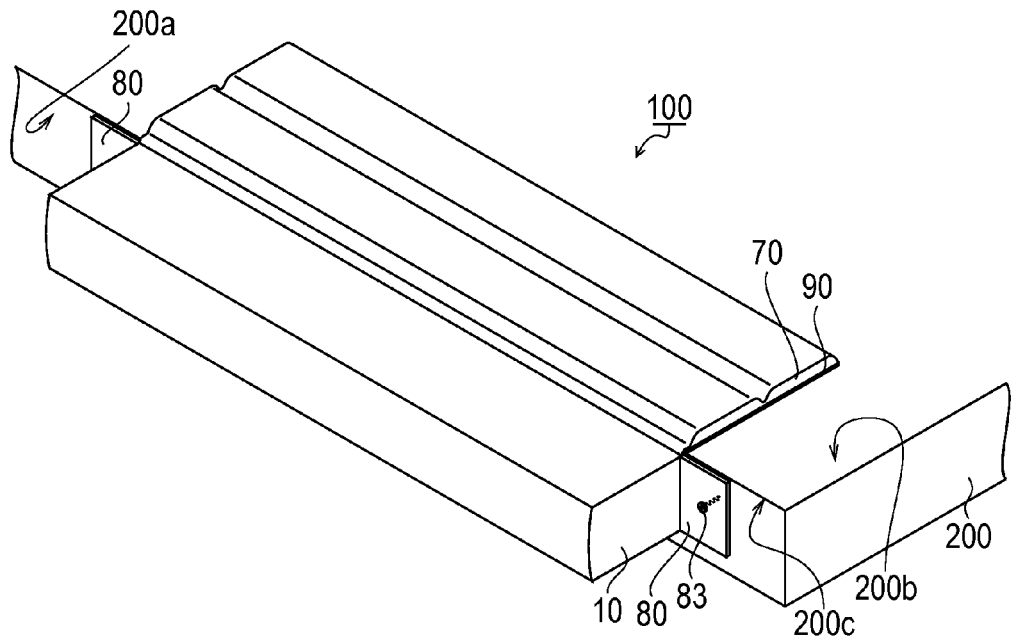
FIG. 7(A) is a schematic diagram showing the RFID tag of the present invention attached to an object and FIG. 7(B) is a schematic diagram showing the RFID tag of the present invention attached to an object.
Figure 7B:
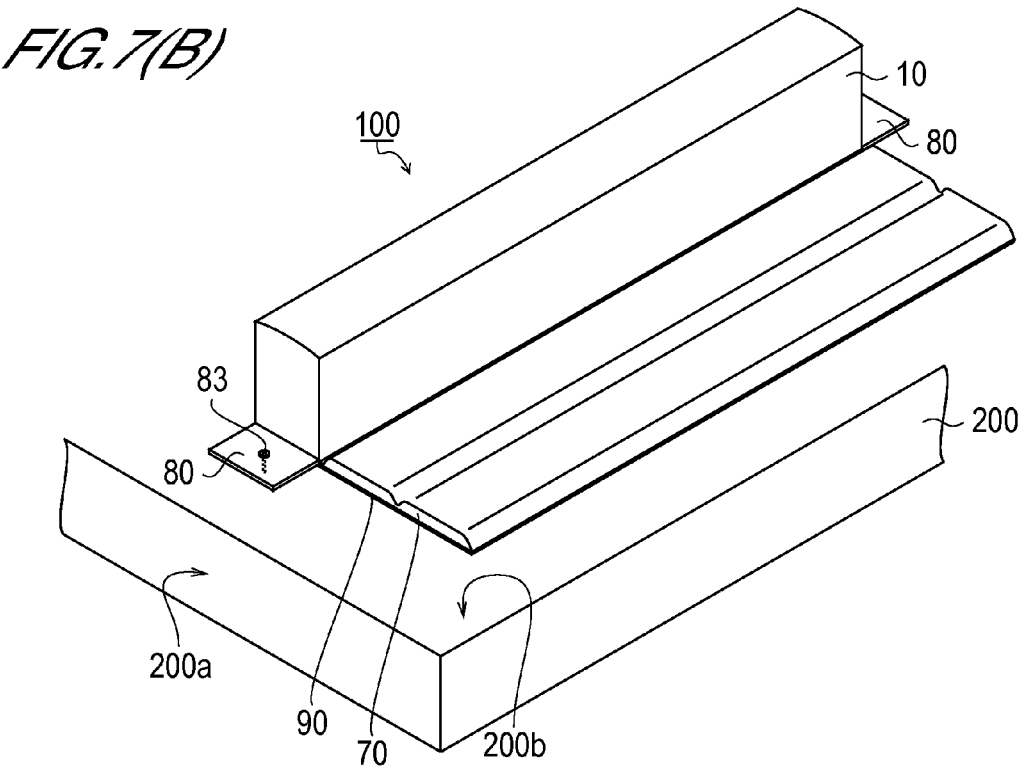

Attachment of the RFID tag 100 to an object is now described with reference to FIGS. 7 and 8. FIG. 7(A) is a schematic diagram showing the RFID tag 100 attached to a side surface 200a of a plate-like object 200. FIG. 7(B) is a schematic diagram showing the RFID tag 100 attached to a flat plate surface 200b of the plate-like object 200.

When attaching the RFID tag 100 to the side surface 200a of the object 200, first, the flat surface 11 of the container 10 is attached to the side surface 200a of the object 200, as shown in FIG. 7(A). At this moment, the long side 13a, which is the boundary between the container 10 and the protruding part 70, is positioned along an edge 200c between the side surface 200a and the flat plate surface 200b of the object 200. Then, the protruding part 70 is folded toward a side of the flat surface 200b of the object 200, and the protruding-part attached surface 70a is attached to the flat plate surface 200b. Thereafter, when tightly fixing the RFID tag 100 by means of the object 200, a screw 83 is inserted into the screw hole 81 of the sub protruding part 80 to screw the RFID tag 100 to the object 200.

In this manner, the RFID tag 100 can stably be attached over the two surfaces, i.e., the side surface 200a and the flat plate surface 200b of the object 200.

In addition, when attaching the RFID tag 100 to the flat plate surface 200b of the object 200, both the flat surface 11 of the container 10 and the protruding-part attached surface 70a are attached to the flat plate surface 200b of the object 200 without folding the protruding part 70, as shown in FIG. 7(B). Then, when tightly fixing the RFID tag 100 by means of the object 200, the screw 83 is inserted into the screw hole 81 of the sub protruding part 80 to screw the RFID tag 100 to the object 200.

Unlike the conventional RFID tags described above, not only the flat surface 11 of the container 10 but also the protruding-part attached surface 70a can be used as the attachment surfaces. As a result, since the area of the entire attached surface is greater than those of the conventional RFID tags, the RFID tag 100 can be attached to an object stably.

Figure 8:
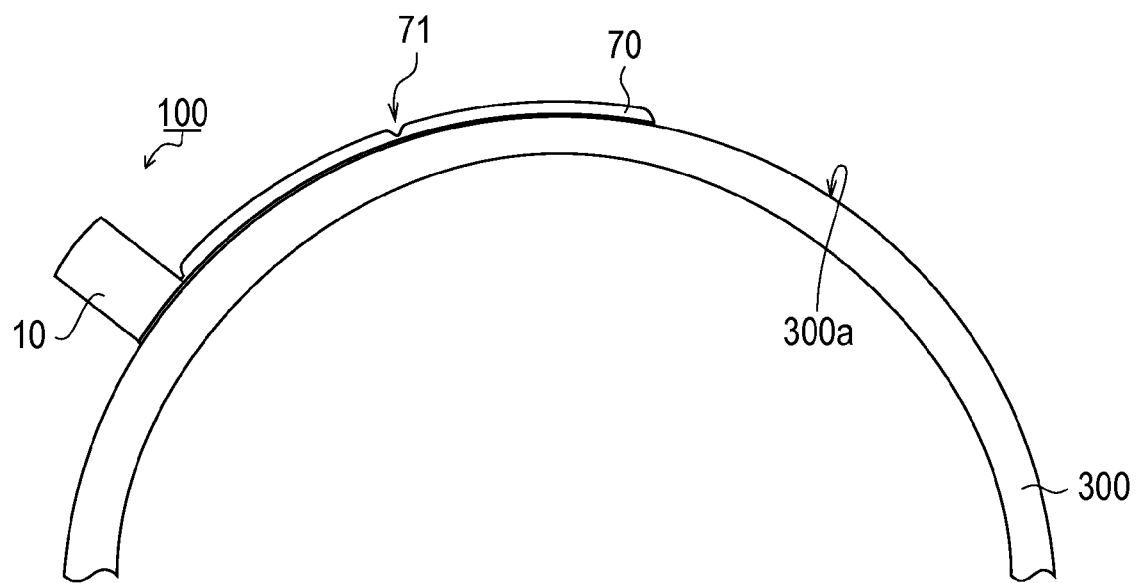
FIG. 8 is a schematic diagram showing the RFID tag of the present invention attached to an object.

FIG. 8 is a schematic diagram showing the RFID tag 100 attached to a curved surface 300a of an object 300 having a curved surface of, for example, a coil. In this configuration example shown in FIG. 8, in order to stably attach the RFID tag 100 to the curved surface 300a of the object 300, the protruding part 70 is made as a sheet having the length L3 (see FIG. 2) greater than those described in the configuration examples shown in FIGS. 7(A) and 7(B).

When attaching the RFID tag 100 to the curved surface 300a of the object 300, the protruding part 70 is curved along the curved surface 300a and wrapped around the object 300, as shown in FIG. 8. Then, when tightly fixing the RFID tag 100 by means of the object 300, a screw is inserted into the screw hole of the sub protruding part to screw the RFID tag 100 to the object 300.

As described above, not only the flat surface 11 of the container 10 but also the protruding-part attached surface 70a can be used as the attachment surfaces. Also, when the length L3 of the protruding part 70 is increased, the RFID tag 100 can be attached to the object, with the protruding part 70 wrapped therearound along the curved surface 300a. Consequently, even when the attachment surface of the object is curved, the RFID tag 100 can be attached stably to the attachment surface of the object. Note that a plurality of the depressions 71 may be provided depending on the shape and size of the curved surface 300a.

The embodiment of attaching the RFID tag 100 to an object is not limited to the examples described with reference to FIGS. 7 and 8, and the shape and size of the object can be changed accordingly. In addition to the configuration examples shown in FIGS. 7 and 8, the RFID tag of the present invention can be attached to surfaces of objects of various shapes and sizes, the surfaces including outer circumferential surfaces and inner circumferential surfaces of tubular objects such as pipes, surfaces of rod-like objects such as reinforcing bars, surfaces of cylindrical liquid containers, and surfaces of cylinders. Therefore, the present invention can be used in product management of industrial products configured by combining products of various shapes or sizes. The present invention can also be used in, for example, category management of automobiles including motorcycles or factories of automobiles, as well as inventory management before and after shipment. Moreover, the sub protruding part 85 described above can be provided if necessary (see FIG. 6). The RFID tag 100 can be fixed tightly to an object by inserting a string or wire into the hole 86 of the sub protruding part 85 and wrapping the object with the string or wire.

EXPLANATION OF REFERENCE NUMERALS

10: Container
11: Flat surface
13a, 13b: Long side
15a, 15b: Short side
17: Opening
19: Lid
21: Concave part
23: Side wall
30: RFID inlet
50: Spacer
70: Protruding part
70a: Protruding-part attached surface
73: Thin plate part
71, 75: Depression
80, 85: Sub protruding part
81: Screw hole
86: Hole
90: Attaching member
100: RFID tag
200, 300: Object

The invention claimed is:
1. A radio frequency identification (RFID) tag, comprising:
a container having at least one rectangular flat surface;
an RFID inlet stored in the container;
a spacer embedded in the container;
a protruding part that is provided in a manner as to protrude from the flat surface to an outside over a length of one long side of the flat surface and is foldable along the long side; and an attaching member in the form of a sheet having as an adhesive surface at least one of a pair of main surfaces being opposite each other, wherein the protruding part has a protruding-part attachment surface extending from the flat surface, wherein the protruding-part attachment surface and the flat surface are configured as an attachment surface, and wherein one of the main surfaces of the attaching member is attached to both the flat surface and the protruding-part attachment surface.

2. The RFID tag according to claim 1, wherein the protruding-part attachment surface has an area same as or greater than that of the flat surface.

3. The RFID tag according to claim 1, wherein the attaching member has the other one of the main surfaces as an adhesive surface.

4. The RFID tag according to claim 1, wherein the attaching member has one of the pair of main surfaces as an adhesive surface, and wherein a magnet is provided on the other one of the main surfaces or inside the attaching member.

5. The RFID tag according to claim 1, wherein the flat surface includes an opening into the container, and further comprising a lid that closes the opening in the flat surface, wherein the attaching member is attached across the lid and a periphery part defining the opening of the flat surface.

6. The RFID tag according to claim 5, wherein the spacer and the lid are integrally configured.

7. The RFID tag according to claim 1, wherein a surface of the container that is on an opposite side of the flat surface is a curved surface that is convexed away from the flat surface.

8. The RFID tag according to claim 1, further comprising a pair of sub protruding parts that is provided so as to protrude outwardly from the flat surface at a pair of short sides of the flat surface that face each other.

9. The RFID tag according to claim 1, further comprising a sub protruding part, which is provided so as to protrude to a long side of the flat surface that is provided on a side opposite to a side having a protruding part, and/or from an end of the protruding part on a side opposite to the container.

* * * * *